July 26, 1960

W. J. TIMSON 2,946,365

TIRE CHAIN FASTENER

Filed June 22, 1959

INVENTOR
William J. Timson,

BY

Fig.6. Beau, Brooks, Buckley & Beau

ATTORNEYS

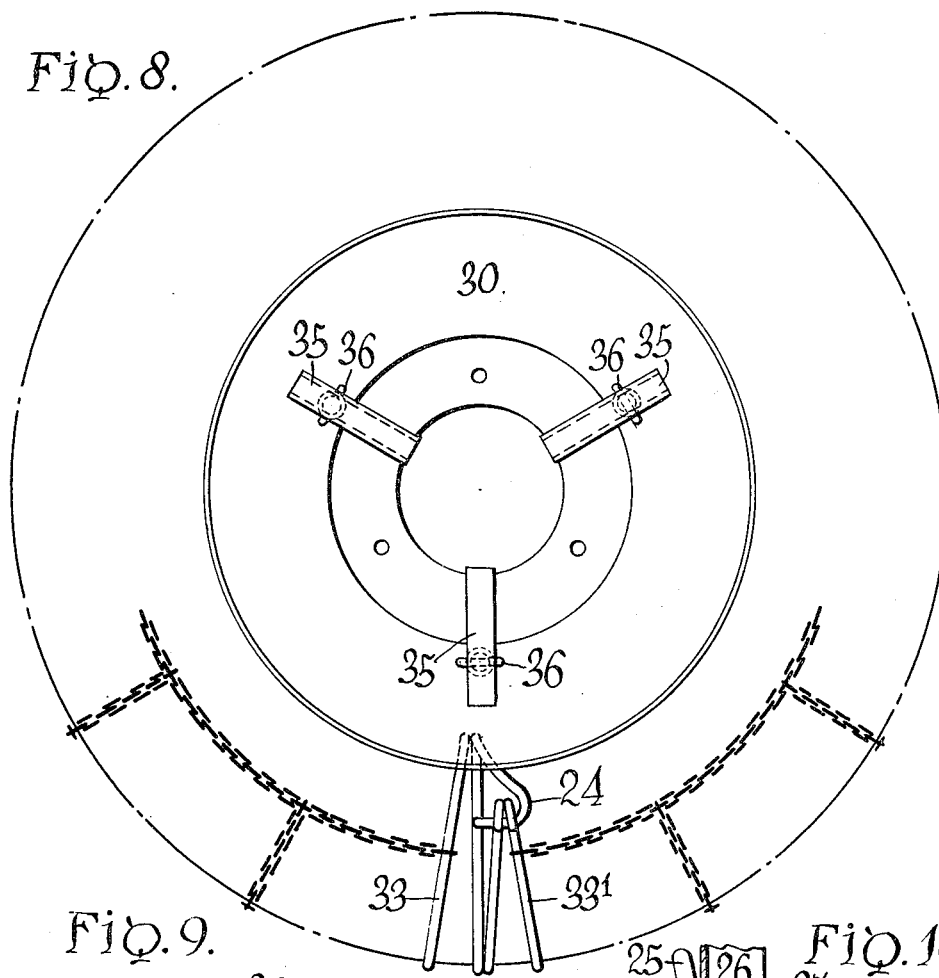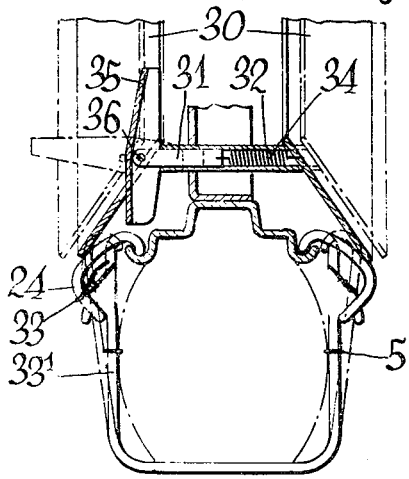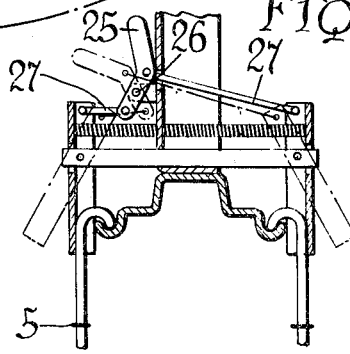

United States Patent Office 2,946,365
Patented July 26, 1960

2,946,365
TIRE CHAIN FASTENER

William J. Timson, Buffalo, N.Y.
(272 Grattan St., Harrisonburg, Va.)

Filed June 22, 1959, Ser. No. 821,984

13 Claims. (Cl. 152—213)

This invention relates generally to a new and useful tire chain fastener arrangement, it being a primary object of my invention to provide means facilitating the fastening of tire chains and like non-skid devices on wheels.

The problem of fastening tire chains and other non-skid devices in place on vehicle wheels has long plagued the motoring public. While many solutions have been proposed, it is my observation that a practical, simple and dependable arrangement enabling mounting of a chain on a tire entirely from the exterior of the vehicle, without reaching behind the wheel and with a minimum of effort and inconvenience, has not heretofore been available.

In one aspect thereof, a non-skid device constructed in accordance with my invention is characterized by the provision of a pair of elongated side members extending around the tire on opposite sides thereof, multiple cross members extending across the tire and interconnecting the side members at spaced points, generally U-shaped end members at the opposite ends of the paired side members connected to the side members and extending therebetween across the tire, together with means carried by the wheel and releasably engaging at least one of the end members on opposite sides of the wheel for securing the device in place.

The foregoing and other objects, advantages and characterizing features of my invention will become clearly apparent from the ensuing detailed description of certain presently contemplated embodiments thereof, taken in conjunction with the accompanying drawing illustrating the same wherein like reference numerals denote like parts throughout the various views and wherein:

Fig. 6 is a similar view, but illustrating still another form;

Fig. 8 is a side elevational view, similar to Fig. 1 but showing another modification;

Fig. 9 is a vertical sectional view thereof; and

Fig. 10 is a vertical sectional view of the unlatching mechanism for the embodiment of Fig. 5.

Figure 1:
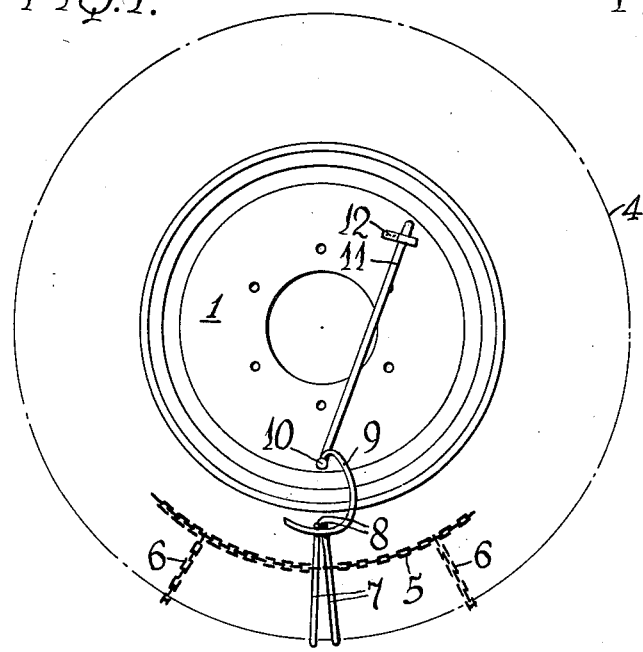
Fig. 1 is a side elevational view of one form of my invention applied to a wheel.
Figure 2:
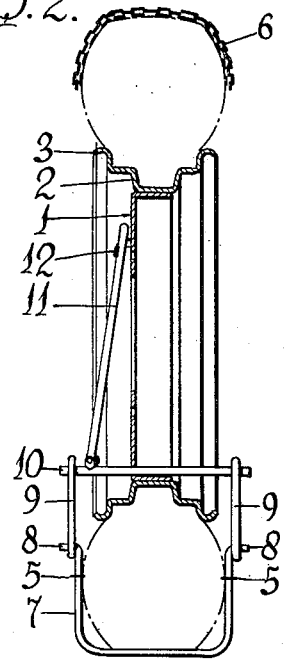
Fig. 2 is a transverse sectional view thereof.

Referring now in detail to the accompanying drawings, and more particularly to the embodiment illustrated in Figs. 1 and 2 thereof, there is shown a wheel, generally designated 1, having a well 2 terminating on opposite sides of the wheel in rims 3, within which there is engaged the beaded circumference of a tire 4.

The non-skid device comprises a pair of side members 5, which can be typical chain links, on opposite sides of tire 4, interconnected at spaced points therealong by cross members 6, which also can comprise chain links and which provide traction in a manner known in the art.

In accord with my invention, an end member 7 is provided at each of the opposite ends of the paired side members 5. End members 7 are of generally U-shaped construction, as clearly illustrated in Fig. 2, having a bight portion extending across the tire tread and allowing for spreading thereof and opposite side leg portions extending generally radially inwardly along the opposite sides of the tire and terminating in outturned ends 8 forming lateral shoulders. The end members 7 are connected to the side members 5, and provide a convenient means for manipulating the chain when applying it to the tire, because the end members are self-supporting and retain their shape, enabling a person to place the chain about the tire from in front of the wheel and without reaching therebehind.

To releasably secure the chain on the wheel, I provide means carried by the wheel and intended to be, in most cases at least, a part of the wheel and sold as such. In the embodiment of Figs. 1 and 2, such means comprise a pivoted catch 9 on each side of the wheel, the catches 9 being conveniently carried by a cross bar 10 extending through the wheel 1 and journaled thereon, appropriate means such as spaced shoulders (not illustrated), being provided to hold the bar 10 against axial shifting.

The catches 9 are in the form of open ended, coil spring adapted to engage beneath the shoulders 8 of end members 7, and are moved into and out of such end member engaging position by means of a handle 11 which is releasably locked in position on the wheel by a fastener 12 carried thereby.

Thus, when it is desired to assemble the chain on the wheel one end member 7 can be engaged in the catches 9, and the chain then placed about the tire, either by grasping the other end member 7 and moving it about the tire periphery, or by rotating the tire. Then, the catches 9 can be disengaged from the one end member 7, and the two end members positioned side by side as illustrated in Fig. 1, following which handle 11 is swung to the position shown in Fig. 1, causing the catches 9 to engage shoulders 8, the handle being releasably held in this position by the fastener 12. It will be noted that it is not necessary to reach behind the tire at any point, and that there are no complicated or heavy mechanisms to be supported and carried about the tire by the person applying the chain. The catches 9 and handle 11 are carried by the wheel, whereby the person applying the chain need handle only the chain and the relatively light weight end members 7 which function as handles for manipulation of the chain.

Figure 3:
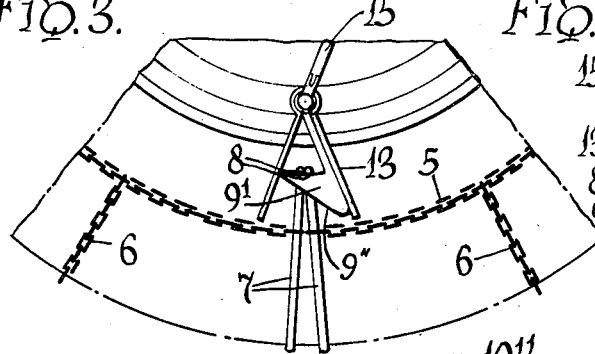
Fig. 3 is a fragmentary view, on an enlarged scale, similar to Fig. 1 but showing a modification.
Figure 4:
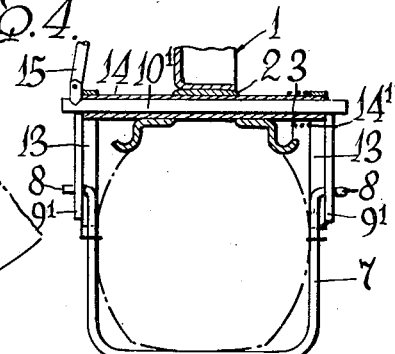
Fig. 4 is a transverse sectional view thereof.

The engagement of the catches and the end members can be facilitated by providing guide members 13 adjacent each of the catches, as illustrated in Figs. 3 and 4, wherein guide members 13 are provided immediately inboard of the catches 9'. The catches 9' are carried by a cross rod 10' journaled in a tube 14 which is welded in the wheel well 2, so that the well is sealed against the entry of moisture, dirt and air, the bar 10' being rotated by a handle 15, if desired.

In this case, the catches 9' are provided with a cam surface 9", and the guide members 13 having diverging wings so that as the end member shoulders 8 are moved into the guide members they are guided thereby against the cam surfaces 9", to pivot the catches 9' toward an open position, against the bias of a torsion spring 14'. The catches 9' engage beneath the shoulders 8, as before, under the urging of the spring 14' as soon as the shoulders have been moved into proper position.

This arrangement facilitates engagement of the catches and the end member shoulders and indeed, if the end members are provided with a base formation enabling them to be self-supporting in upright position, on the roadway or the like, as described with reference to Figs. 5 and 6, it is contemplated that such engagement can be automatic, by engaging one end member and the catches and then simply driving the car across the chain until the other end member is engaged by the catches.

Figure 5:
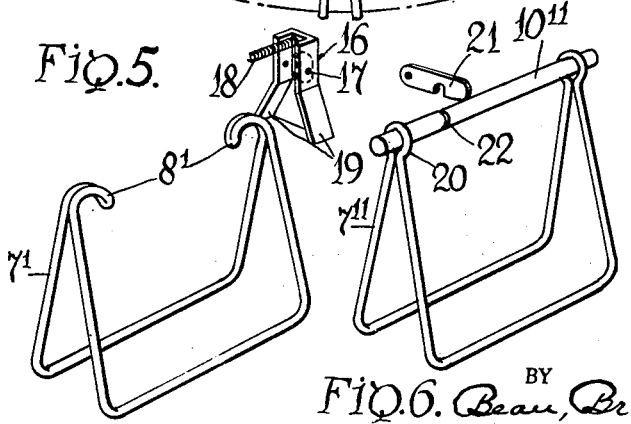
Fig. 5 is an exploded detailed view, in perspective, of another form of my invention.

The embodiment of Fig. 5 uses the wheel rims 3 as a shoulder engaging part, which rims can be reinforced and made wider for this purpose. In this embodiment end members 7' are provided with a base for standing in upright position, only one such end member being illustrated because the end members are identical. In this embodiment, the end members are provided with spaced bight and side leg portions, the upper ends of the side leg portions being formed to provide generally laterally directed, inturned shoulders 8' in the form of inverted hooks, for snapping over the wheel rims 3. The spaced bight portions comprise a base, whereby the end members will stand upright on a supporting surface. Latch members 16, pivoted at 17 on cross bar 10 or tube 14 (Figs. 2 and 4, respectively) are resiliently yieldable, against the urging of springs 18, to permit engagement of the shoulders 8' and rims 3, while thereafter confining the same against substantial relative movement, having side portions 19 receiving therebetween the shoulders 8' of both end members. Such engagement can be automatic, as described with reference to Figs. 3 and 4, and when it is desired to disengage said shoulders and rims the unlatching mechanism of Fig. 10 is used.

This mechanism includes a lever 25 pivoted at 26 on wheel 1, and pivotally connected at opposite sides of pivot 26 to links 27 which are in turn pivotally connected to members 16. Upon pivoting lever 25 in one direction members 16 are moved, against their spring bias, to end member releasing position, means (not illustrated) being provided, if desired, to hold lever 25 in such position.

In the embodiment of Fig. 6, each end member 7" is provided adjacent its opposite ends with loops or eyes 29 for receiving a cross bar 10", which can be slid through a supporting tube, such as 14 in Fig. 4, with means such as a keeper 21, pivoted on the wheel 1 and adapted to engage a groove 22 in the cross bar 10", to prevent axial movement thereof.

Figure 7:
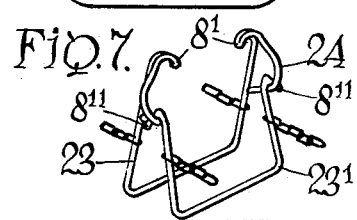
Fig. 7 is a similar view, on a reduced scale and illustrating still another form of my invention.

In the embodiment of Fig. 7, there is shown an end member 23 generally corresponding in U-shaped configuration to the other end members illustrated, having laterally directed shoulders 8' and also having latch portions 24, the lower parts of which provide shoulders for being engaged by laterally directed shoulders 8" of the other end member 23'. The upper parts of latch portions 24, adjacent the shoulders 8', are spaced apart, across the tire, further than the shoulders engaged by the shoulders 8", whereby upon detaching the end member 23 from the wheel rims, and moving the same radially outwardly of the wheel, the shoulders 8" are alined with the spaced upper parts of the latch portions for being readily slipped outwardly therefrom.

In the embodiment of Figs. 8 and 9, end member 33' engages latch portions 24 of end member 33, as in the embodiment of Fig. 7. However, the end members 33 and 33' are self-supporting in upright position, as described with reference to Figs. 5 and 6, and end member 33 can engage the wheel rims at any point therearound. To lock end member 33 to the rims, there is provided a mechanism including oppositely facing, frusto-conical ring members 30, on opposite sides of the wheel. Members 30 overlie member 33 adjacent the rims, and are interconnected by three, or more, telescoping struts having inner and outer members 31 and 32, respectively. Springs 34 bias ring members 30 toward each other, to lock end member 33 to the wheel, and means such as a cam lever 35, pivoted at 36 on strut member 31 for bearing against member 32, are provided for shifting rings 30 to end member releasing position.

It will be appreciated that, with this construction, automatic fastening of the chain on the wheel is facilitated. The chain is laid upon the roadway, with end members 33 and 33' upright, and the wheel is simply driven thereover in a direction such that member 33 first latches to the wheel and member 33' then latches to member 33.

In each embodiment there is provided an end member of self-sustaining configuration, to facilitate the convenient manipulation of the tire chain from in front of the wheel, without reaching behind it, with the end members engaging parts which either are a part of the wheel or are carried by the wheel, the engagement being readily accomplished from in front of the wheel. Of course, features of certain embodiments can be combined with features of others. For example, all of the end members can be made to stand upright, as in the embodiments of Figs. 5, 6 and 8–10.

In the embodiment of Fig. 7, end member 23 is locked to the wheel, by means such as illustrated in Figs. 5 and 10, or in Figs. 8 and 9. Also, where the cross bars, tubes and/or struts interfere with the brake drum or other wheel parts, they can be extended through the wheel well as illustrated in Figs. 3 and 4.

While I have illustrated and described in detail only certain embodiments of my invention, that has been done for purposes of illustration only, without thought of limitation.

Having fully disclosed and described my invention, together with its mode of operation, what I claim as new is:

1. A non-skid device for vehicle tires comprising, in combination with a wheel having a tire thereon, a pair of elongated side members extending around said tire on opposite sides thereof, multiple cross members extending across said tire and interconnecting said side members at spaced points therealong, a generally U-shaped end member at each of the opposite ends of said pair of side members, said end members being connected to said side members and extending therebetween across said tire, and means for securing said device on said tire including means carried by said wheel on opposite sides thereof and movable relative thereto to releasably engage at least one of said end members on opposite sides of said wheel.

2. A non-skid device as set forth in claim 1, wherein each of said end members is provided with generally laterally directed shoulders adjacent the opposite ends thereof, and wherein said last-named means comprise catches pivoted on said wheel on opposite sides thereof, actuating means on one side of said wheel for moving both said catches into and out of a position engaging said shoulders, and means releasably holding said catches in said position.

3. A non-skid device as set forth in claim 2, wherein said actuating means comprises a handle connected to said catches for movement therewith, and said releasable holding means comprises a fastener carried by said wheel and releasably engaging said handle.

4. A non-skid device as set forth in claim 2, wherein said releasable holding means comprises spring means urging said catches into said position.

5. A non-skid device as set forth in claim 4, together with guide means positioned adjacent each of said catches and comprising diverging cam surfaces receiving said end member shoulders and guiding the same into engagement with said catches.

6. A non-skid device for vehicle tires comprising, in combination with a wheel having a tire thereon, a pair of elongated side members extending around said tire on opposite sides thereof, multiple cross members extending across said tire and interconnecting said side members at spaced points therealong, a generally U-shaped end member at each of the opposite ends of said pair of side members, said end members being connected to said side members and extending therebetween across said tire, and means for securing said device on said tire including means carried by said wheel and releasably engaging at least one of said end members on opposite sides of said wheel, wherein said last-named means comprise the rims of said wheel, and said end members are provided with generally laterally directed shoulders adjacent the opposite ends thereof engaging said rims.

7. A non-skid device for vehicle tires comprising, in combination with a wheel having a tire thereon, a pair of elongated side members extending around said tire on opposite sides thereof, multiple cross members extending across said tire and interconnecting said side members at spaced points therealong, a generally U-shaped end member at each of the opposite ends of said pair of side members, said end members being connected to said side members and extending therebetween across said tire, and means for securing said device on said tire including means carried by said wheel and releasably engaging at least one of said end members on opposite sides of said wheel, wherein at least one of said end members is provided with a base for standing in an upright position on a supporting surface.

8. A non-skid device for vehicle tires comprising, in combination with a wheel having a tire thereon, a pair of elongated side members extending around said tire on opposite sides thereof, multiple cross members extending across said tire and interconnecting said side members at spaced points therealong, a generally U-shaped end member at each of the opposite ends of said pair of side members, said end members being connected to said side members and extending therebetween across said tire, and means for securing said device on said tire including means carried by said wheel and releasably engaging at least one of said end mmebers on opposite sides of said wheel, wherein said last named means are carried by the well of said wheel.

9. A non-skid device for vehicle tires comprising, in combination with a wheel having a tire thereon, a pair of elongated side members extending around said tire on opposite sides thereof, multiple cross members extending across said tire and interconnecting said side members at spaced points therealong, a generally U-shaped end member at each of the opposite ends of said pair of side members, said end members being connected to said side members and extending therebetween across said tire, and means for securing said device on said tire including means carried by said wheel and releasably engaging at least one of said end members on opposite sides of said wheel, wherein said last-named means comprise the rims of said wheel, one of said end members being provided with generally laterally directed shoulders adjacent the opposite ends thereof engaging said rims, said one end member being provided with latch portions adjacent its opposite ends, and the other of said end members being provided with generally laterally directed shoulders adjacent the opposite ends thereof releasably engaging said latch portions.

10. a non-skid device for vehicle tires comprising, in combination with a wheel having a tire thereon, a pair of elongated side members extending around said tire on opposite sides thereof, multiple cross member extending across said tire and interconnecting said side members at spaced points therealong, a generally U-shaped and shape retaining end member having generally laterally extending shoulders adjacent the opposite ends thereof at each of the opposite ends of said pair of side members, said end members being connected to said side members and extending therebetween across said tire, said side members, cross members and end members normally being separate from said wheel and tire, and means carried by said wheel and selectively operable to releasably mount said assembled side members, cross members and end members on said tire, said last-named means comprising a pair of catches pivotally mounted on said wheel on opposite sides thereof, and actuating means carried by said wheel and connected to said catches for pivotally moving the same into and out of engagement with said end member shoulders, said actuating means being engageable from the outerside of said wheel.

11. A non-skid device for vehicle tires comprising, in combination with a wheel having a tire thereon, a pair of elongated side members extending around said tire on opposite sides thereof, multiple cross members extending across said tire and interconnecting said side members at spaced points therealong, a generally U-shaped and shape retaining end member having generally laterally extending shoulders adjacent the opposite ends thereof at each of the opposite ends of said pair of side members, said end members being connected to said side members and extending therebetween across said tire, said side members, cross members and end members normally being separate from said wheel and tire, and means carried by said wheel and selectively operable to releasably mount said assembled side members, cross members and end members on said tire, said last-named means comprising mounting means extending through said wheel from the outer to the inner side thereof, catches carried by said mounting means on the opposite sides of said wheel for rotary movement in unison, and means including a handle positioned on the outer side of said wheel and connected to said catches for rotating the same into and out of engagement with said end member shoulders.

12. A non-skid device as set forth in claim 6, together with latch means pivoted on said wheel and confining said shoulders against substantial movement relative to said wheel, said latch means being resiliently yieldable to enable selective engagement and disengagement of said shoulders and rims.

13. A non-skid device as set forth in claim 9, together with rings carried by said wheel on opposite sides thereof, said rings overlying said rims and spring urged toward each other to hold said one end member shoulders engaged on said rims.

References Cited in the file of this patent

UNITED STATES PATENTS

| | | |
|---|---|---|
| 1,733,871 | Frank | Oct. 29, 1929 |
| 2,655,972 | Doney | Oct. 28, 1953 |
| 2,880,776 | Rucker | Apr. 7, 1959 |